(12) United States Patent
Matsumoto et al.

(10) Patent No.: US 7,365,904 B2
(45) Date of Patent: Apr. 29, 2008

(54) OPTICAL WAVELENGTH CONVERTER

(75) Inventors: Keisuke Matsumoto, Tokyo (JP);
Toshitaka Aoyagi, Tokyo (JP);
Kazuhisa Takagi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 101 days.

(21) Appl. No.: 11/389,315

(22) Filed: Mar. 27, 2006

(65) Prior Publication Data

US 2006/0291038 A1 Dec. 28, 2006

(30) Foreign Application Priority Data

Jun. 24, 2005 (JP) .............. 2005-184927

(51) Int. Cl.
*H01S 3/00* (2006.01)
*G02F 1/35* (2006.01)
*G02F 1/035* (2006.01)

(52) U.S. Cl. .................. 359/344; 359/332; 385/2

(58) Field of Classification Search ........... 359/344, 359/332; 385/3, 2
See application file for complete search history.

(56) References Cited

U.S. PATENT DOCUMENTS 6,069,732 A * 5/2000 Koch et al. ............. 359/344
6,356,382 B1 * 3/2002 Nakano et al. .......... 359/332
2001/0021060 A1 * 9/2001 Kim ....................... 359/332

OTHER PUBLICATIONS

Degens, B. et al.; "New modular SOA-based active-passive integrated Mach-Zehnder interferometer and first standard mode 40 Gb/s all-optical wavelength conversion on the C-band", *ECOC2002* PD3.1.

* cited by examiner

*Primary Examiner*—Mark Hellner
(74) *Attorney, Agent, or Firm*—Leydig, Voit & Mayer, Ltd.

(57) ABSTRACT

An optical wavelength converter includes: a first branch passage and a second branch passage receiving direct current light, one of the first branch passage and the second branch passage receiving input signal light; wavelength converting semiconductor optical amplifiers inserted into the first branch passage and the second branch passage, respectively; and a signal amplifying semiconductor optical amplifier for amplifying the input signal light, which is coupled with a port through which the input signal light is input to one of the first branch passage and the second branch passage. In the optical wavelength converter, differential gain of the signal amplifying semiconductor optical amplifier at a wavelength of the input signal light is less than differential gain of the wavelength converting semiconductor optical amplifier at the wavelength of the direct current light.

7 Claims, 7 Drawing Sheets

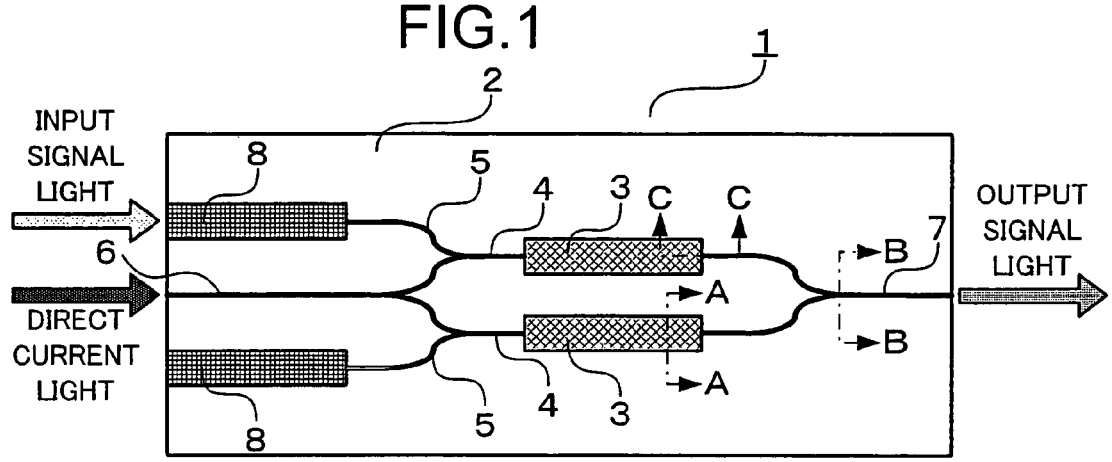
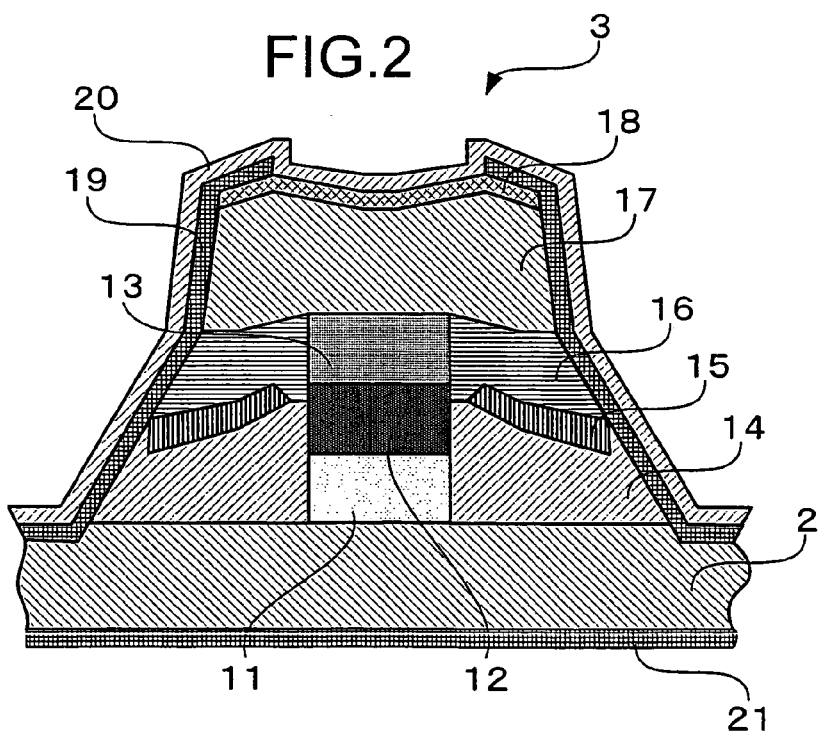

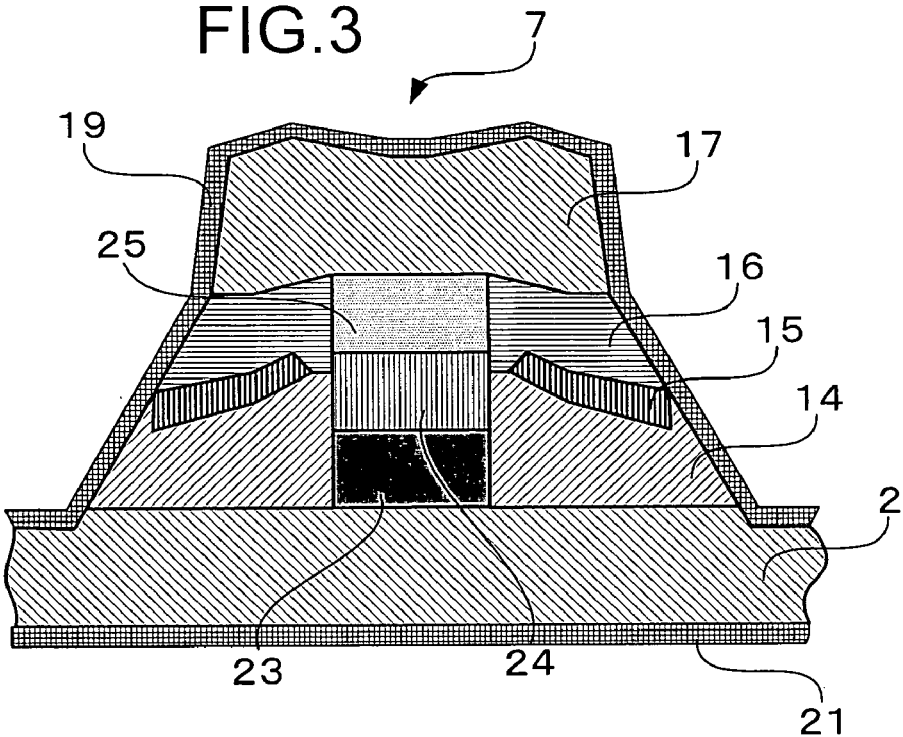
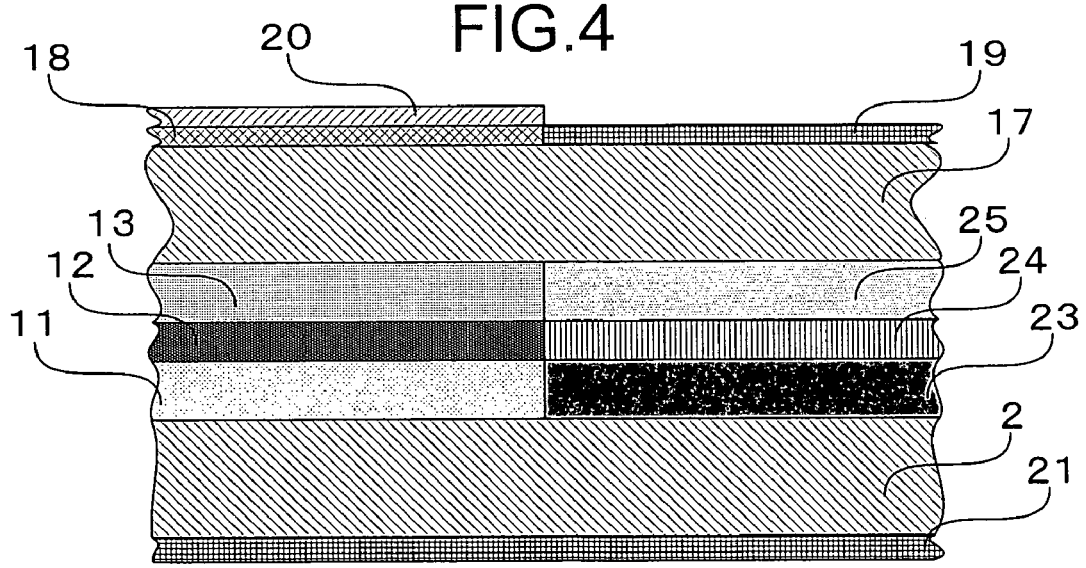

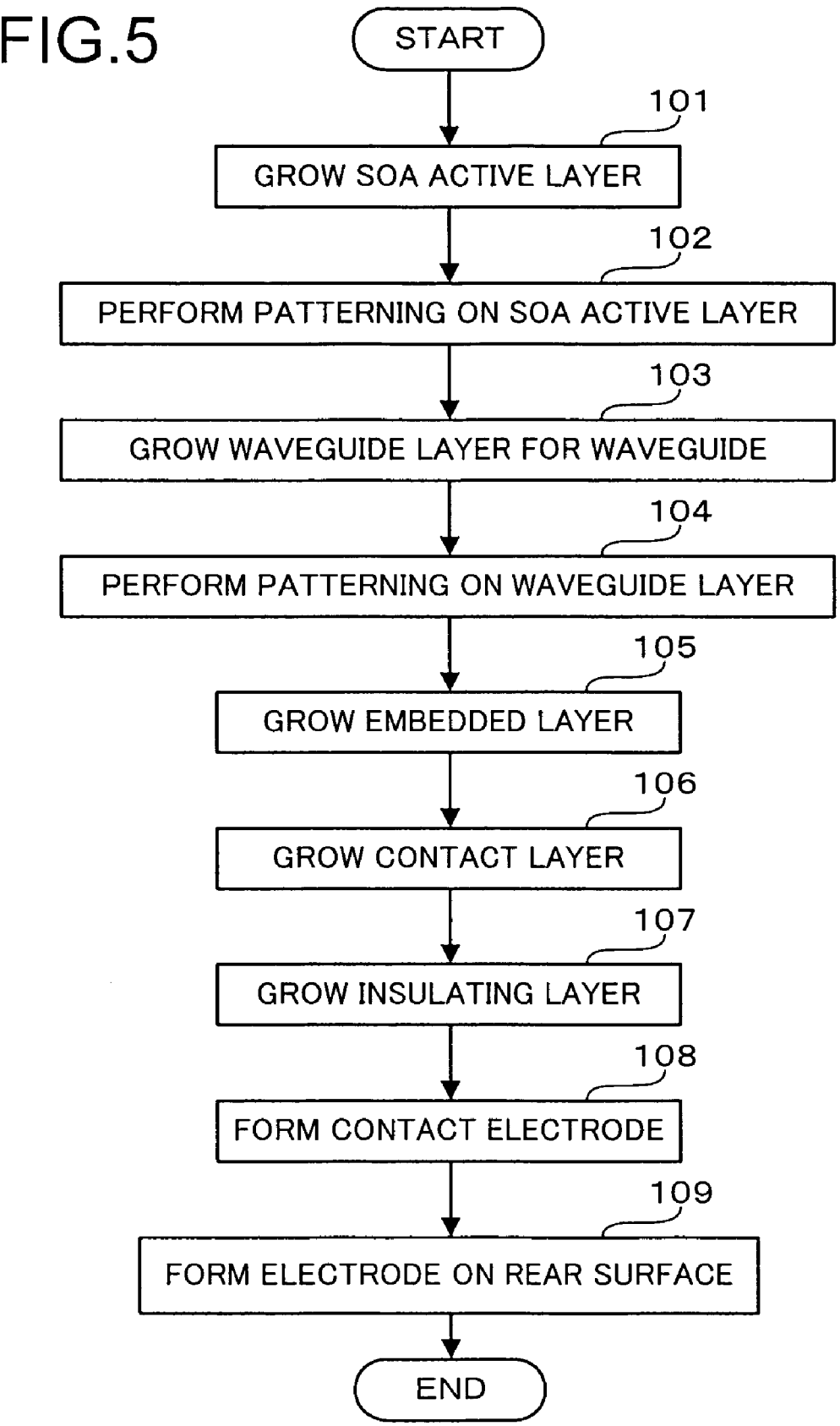

US 7,365,904 B2

OPTICAL WAVELENGTH CONVERTER

BACKGROUND OF THE INVENTION

1. Field of the Invention

The present invention relates to an optical wavelength converter that is used in a communication field for converting one wavelength into another wavelength while ensuring continued performance of an optical signal to be transmitted.

2. Description of the Related Art

In a conventional optical wavelength converter that utilizes change in phase of a semiconductor optical amplifier (hereinafter, abbreviated to its acronym, SOA), SOAs are inserted to both branches of a Mach-Zehnder (hereinafter, abbreviated to its acronym MZ) interferometer. Input signal light is inputted to one of the branches, and direct current light is inputted to both the branches. The change in phase, which is induced in the SOA by the input signal light, causes modulation of output signal light of the MZ interferometer. The increase in induced emission caused by the input signal light reduces a carrier density. As a result, a refractive index increases due to a plasma effect, which causes the change in phase.

Then, in order to expand an input dynamic range of the optical wavelength converter, a signal amplifying SOA for amplifying the input signal light is arranged immediately after an input port to deal with variation in intensity of the input signal light.

However, when an SOA having the same structure as that of wavelength converting SOA inserted to the branch of the MZ interferometer is used as the signal amplifying SOA, a gain of the SOA is easy to be saturated because the signal amplifying SOA has an optical confinement coefficient of 0.6, which is an excessively large value. Therefore, there arises a problem in that a waveform is distorted in the case of, for example, weak input signal light at a high speed exceeding a speed of 40 Gbps.

In view of this, the optical wavelength converter is structured such that a ratio of a working area to an optical confinement coefficient in the signal amplifying SOA is larger than a ratio of a working area to an optical confinement coefficient in the wavelength converting SOA, whereby deformation of the input signal light is prevented (for example, refer to JP 10-319454 A).

However, there is a problem in that, when the SOAs are formed to have different working areas of working waveguides, the waveguides are difficult to be formed with high precision because the waveguides each have a width of, for example, about 0.5 μm.

SUMMARY OF THE INVENTION

The present invention has been made in view of the above, and therefore has an object to provide an optical wavelength converter which has a wide input dynamic range, in which deformation of input signal light is prevented, and in which a waveguide is easily formed.

According to the present invention, there is provided an optical wavelength converter, including: a first branch passage; a second branch passage, the first branch passage and the second branch passage composing a Mach-Zehnder interferometer, both of the first branch passage and the second branch passage being inputted with direct current light, one of the first branch passage and the second branch passage being inputted with input signal light; wavelength converting semiconductor optical amplifiers inserted into the first branch passage and the second branch passage, respectively; and a signal amplifying semiconductor optical amplifier for amplifying the input signal light, which is coupled with a port thorough which the input signal light is inputted to the one of the first branch passage and the second branch passage, in which, a differential gain of the signal amplifying semiconductor optical amplifier at a wavelength of the input signal light is less than a differential gain of the wavelength converting semiconductor optical amplifier at a wavelength of the direct current light.

In the optical wavelength converter according to the present invention, the respective wavelengths of the input signal light and the direct current light are selected such that the differential gain of the signal amplifying SOA at the wavelength of the input signal light is less than the differential gain of the wavelength converting SOA at the wavelength of the direct current light. Therefore, while the input dynamic range is kept wide, signal deformation can be prevented even with the large intensity of the input signal light.

BRIEF DESCRIPTION OF THE DRAWINGS

In the accompanying drawings:

FIG. 1 is a plan view of an optical wavelength converter according to Embodiment 1 of the present invention;

FIG. 2 is a sectional view of an SOA according to Embodiment 1 of the present invention;

FIG. 3 is a sectional view of a waveguide according to Embodiment 1 of the present invention;

FIG. 4 is a sectional view of a joint state between the SOA and the waveguide according to Embodiment 1 of the present invention;

FIG. 5 is a flow chart of a procedure of manufacturing the optical wavelength converter according to Embodiment 1 of the present invention;

DETAILED DESCRIPTION OF THE PREFERRED EMBODIMENTS

Embodiment 1

Figure 6:
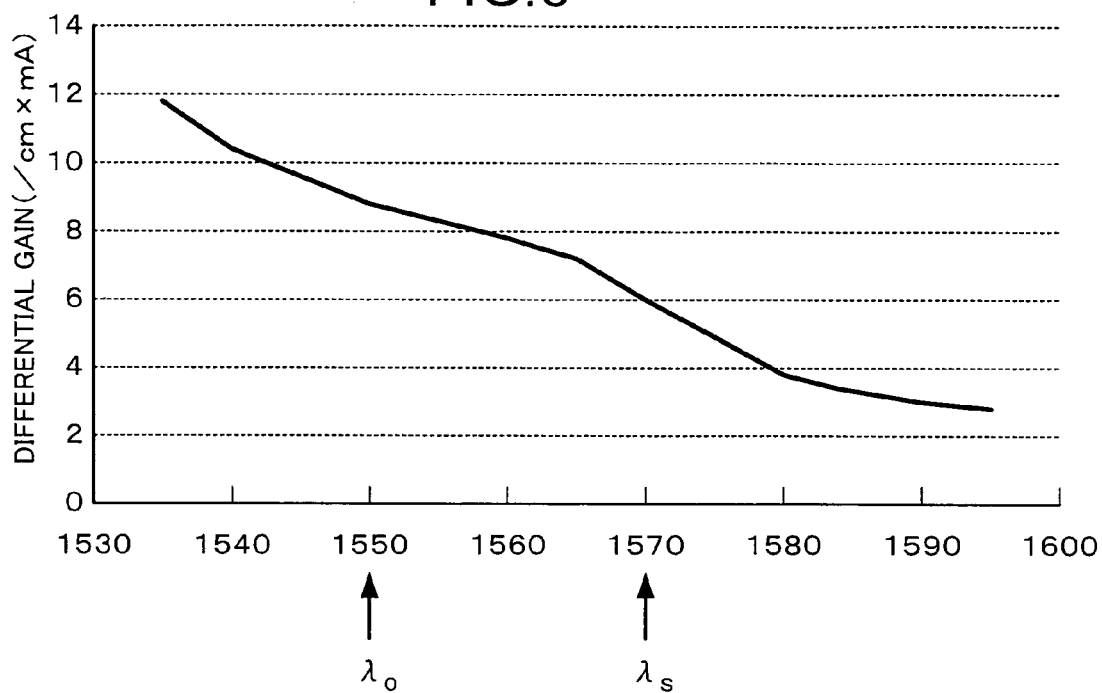
FIG. 6 shows data of a differential gain with respect to a wavelength of the SOA according to Embodiment 1 of the present invention.

FIG. 1 is a plan view of an optical wavelength converter according to Embodiment 1 of the present invention. FIG. 2 is a sectional view of an SOA taken along the line A-A of FIG. 1 according to Embodiment 1. FIG. 3 is a sectional view of a waveguide taken along the line B-B of FIG. 1 according to Embodiment 1. FIG. 4 is a sectional view of a joint state between the SOA and the waveguide taken along the line C-C of FIG. 1 according to Embodiment 1. FIG. 5 is a flow chart of a procedure of manufacturing the optical wavelength converter according to Embodiment 1. FIG. 6 shows data of a differential gain with respect to a wavelength of the SOA according to Embodiment 1.

An optical wavelength converter 1 in Embodiment 1 of the present invention is structured as an MZ interferometer on an n-InP substrate 2 serving as a semiconductor substrate. The MZ interferometer is composed of: two wavelength converting waveguides 4, in each of which an SOA 3 for wavelength conversion is interposed, serving as two branch passages of the MZ interferometer; four branch waveguides 5 that extend, through Y branch, from one ends of the respective wavelength converting waveguides 4; an input waveguide 6 that combines two of the branch waveguides 5 extending, through Y branch, from the wavelength converting waveguides 4; and an output waveguide 7 that combines the other ends of the wavelength converting waveguides 4.

Further, the wavelength converting SOA 3 is interposed in each of the wavelength converting waveguides 4. The signal amplifying SOA 8 is inserted at each of input ports for input signal light of the two branch waveguides 5, which are not connected to the input waveguide 6. Note that one of the signal amplifying SOAs 8 is provided as a spare.

Then, the input signal light is inputted to the other signal amplifying SOA 8. Further, direct current light is inputted to the input waveguide 6. Output signal light is outputted from the output waveguide 7.

In the wavelength converting SOA 3, as shown in FIG. 2, sequentially laminated on the n-InP substrate 2 are an n-InP clad layer 11, an InGaAsP layer 12 serving as an active layer, and a first p-InP clad layer 13, each of which has a width of 1 μm and a length of 2 mm.

Embedded on both sides of the layers 11, 12, and 13 in their width directions are a first p-InP layer 14, an n-InP layer 15, and a second p-InP layer 16.

Further, a second p-InP clad layer 17 is laminated so as to cover the first p-InP clad layer 13 and the second p-InP layer 16. Then, a contact layer 18 is laminated so as to cover the second p-InP clad layer 17.

Moreover, an insulating film 19 is laminated to cover the contact layer 18 except a part thereof and cover side surfaces of the first p-InP layer 14, the n-InP layer 15, and the second p-InP layer 16, which have been embedded, and side surfaces of the second p-InP clad layer 17.

Furthermore, a contact electrode 20 is laminated to cover the insulating film 19 and the contact layer 18 exposed at an opening of the insulating film 19. On the other hand, an electrode 21 is formed on a rear surface of the n-InP substrate 2.

The signal amplifying SOA 8 is the same as the wavelength converting SOA 3 shown in FIG. 2.

As to each of the wavelength converting waveguides 4, the branch waveguides 5, the input waveguide 6, and the output waveguide 7 (hereinafter, collectively referred to as waveguides) which compose the MZ interferometer, a first i-InP layer 23, an InGaAsP layer 24 serving as a waveguide layer, a second i-InP layer 25, each of which has a width of 1 μm, are sequentially laminated on the n-InP substrate 2, as shown in FIG. 3. The InGaAsP layer 24 has composition different from that of the InGaAsP layer 12 serving as the active layer.

Embedded on both sides of the layers 23, 24, and 25 in their width directions are the first p-InP layer 14, the n-InP layer 15, and the second p-InP layer 16.

Further, the second p-InP clad layer 17 is laminated so as to cover the second i-InP layer 25 and the second p-InP layer 16.

Moreover, the insulating film 19 is laminated so as to cover the second p-InP layer 17 and the side surfaces of the first p-InP layer 14, the n-InP layer 15, and the second p-InP layer 16, which have been embedded.

Furthermore, butt joint is established between the wavelength converting SOA 3, signal amplifying SOA 8, and the waveguide as shown in FIG. 4.

Next, description will be made of a procedure of manufacturing the optical wavelength converter 1 according to Embodiment 1 with reference to FIG. 5.

In step S101, the n-InP clad layer 11, the InGaAsP layer 12 serving as the active layer, and the first p-InP clad layer 13 are sequentially grown over the entire surface of the n-InP substrate 2 by an organic metal vapor phase epitaxy method.

In step S102, a mask which is composed of a mesa film is formed at a position where the SOA is arranged. Then, etching is performed.

In step S103, the first i-InP layer 23, the InGaAsP layer 24 serving as the waveguide layer, and the second i-InP layer 25 are grown. At this point, they are grown such that butt joint is established between the active layer and the waveguide layer.

In step S104, the mask, which is composed of the mesa film, is formed at a position where the waveguide is arranged. Then, etching is performed to leave the waveguide.

In step S105, the p-InP layer 14, the n-InP layer 15, and the p-InP layer 16 are grown in an embedded manner on both sides of the n-InP clad layer 11, the InGaAsP layer 12, and the p-InP clad layer 13, which are left at the position where the SOA is arranged, and on both sides of the i-InP layer 23, the InGaAsP layer 24, and the i-InP layer 25, which are left at the position where the waveguide is arranged.

In step S106, the p-InP layer 17 and the contact layer 18 are sequentially grown on the p-InP clad layer 13, which is left at the position where the SOA is arranged, the i-InP layer 25, which is left at the position where the waveguide is arranged, and the p-InP layer 16, which is grown in an embedded manner. Then, etching is performed to leave only the contact layer 18 located at the position where the SOA is arranged.

In step S107, the insulating film 19 is formed on the entire surface of the resultant. Then, etching is performed to the insulating film 19 covering the contact layer 18 of the SOA, thereby forming an opening.

In step S108, the contact electrode 20 is formed so as to overlap with the contact layer 18 of the SOA.

In step S109, a rear surface of the n-InP substrate 2 is polished to be reduced in thickness to about 100 μm. Then, the electrode 21 is formed on the rear surface.

Next, description will be made of conditions of operations of the optical wavelength converter 1 according to Embodiment 1 of the present invention.

A differential gain between the wavelength converting SOA 3 and the signal amplifying SOA 8 in the optical wavelength converter 1 becomes smaller as a wavelength is longer in a wavelength range of from 1530 nm to 1600 nm, as shown in FIG. 6.

Further, input signal light Ps with a wavelength of λs and direct current light Po with a wavelength of λo are inputted to the optical wavelength converter 1. The wavelength of λo is selected to be shorter than the wavelength of λs.

For example, when the wavelength of λs and the wavelength of λo are assumed to be 1570 nm and 1550 nm, the differential gains are 6 and 9, respectively, as shown in FIG. 6.

When the light inputted to the SOA is amplified in the SOA, the characteristics of the SOA, which are related to a saturation phenomenon of the amplified light, are an optical confinement coefficient, differential gain, length and sectional area of the active layer in the SOA. Saturation is more difficult to be caused as the quotient obtained by dividing the product of the optical confinement coefficient, the differential gain, and the length by the sectional area is smaller.

Then, the optical confinement coefficient, length and sectional area of the active layer are the same between the wavelength converting SOA 3 and the signal amplifying SOA 8 according to Embodiment 1, but light with a wavelength having a small differential gain is used as the input signal light Ps. Thus, even if light with a large intensity is inputted, an increment of the light confined in the active layer is small. This can prevent saturation in signal amplification. On the other hand, even if light with a small intensity is inputted, the light is amplified in the signal amplifying SOA 8. Thus, a wide input dynamic range is obtained.

In the above-described optical wavelength converter 1, the respective wavelengths of the input signal light and the direct current light are selected such that the differential gain of the signal amplifying SOA 8 at the wavelength of the input signal light is less than the differential gain of the wavelength converting SOA 3 at the wavelength of the direct current light. Therefore, even if the input signal light has a large intensity, signal deformation can be prevented while the input dynamic range is kept wide.

Embodiment 2

Figure 7:
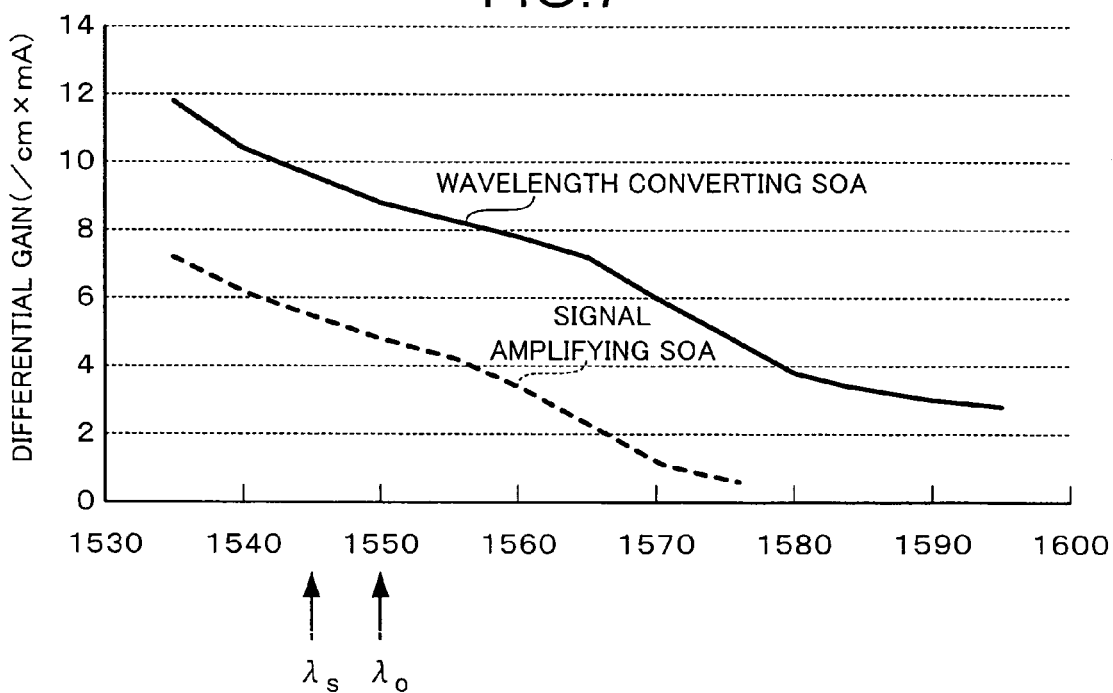
FIG. 7 shows data of differential gains with respect to a wavelength of a wavelength converting SOA and a wavelength of a signal amplifying SOA according to Embodiment 2 of the present invention.
Figure 8:
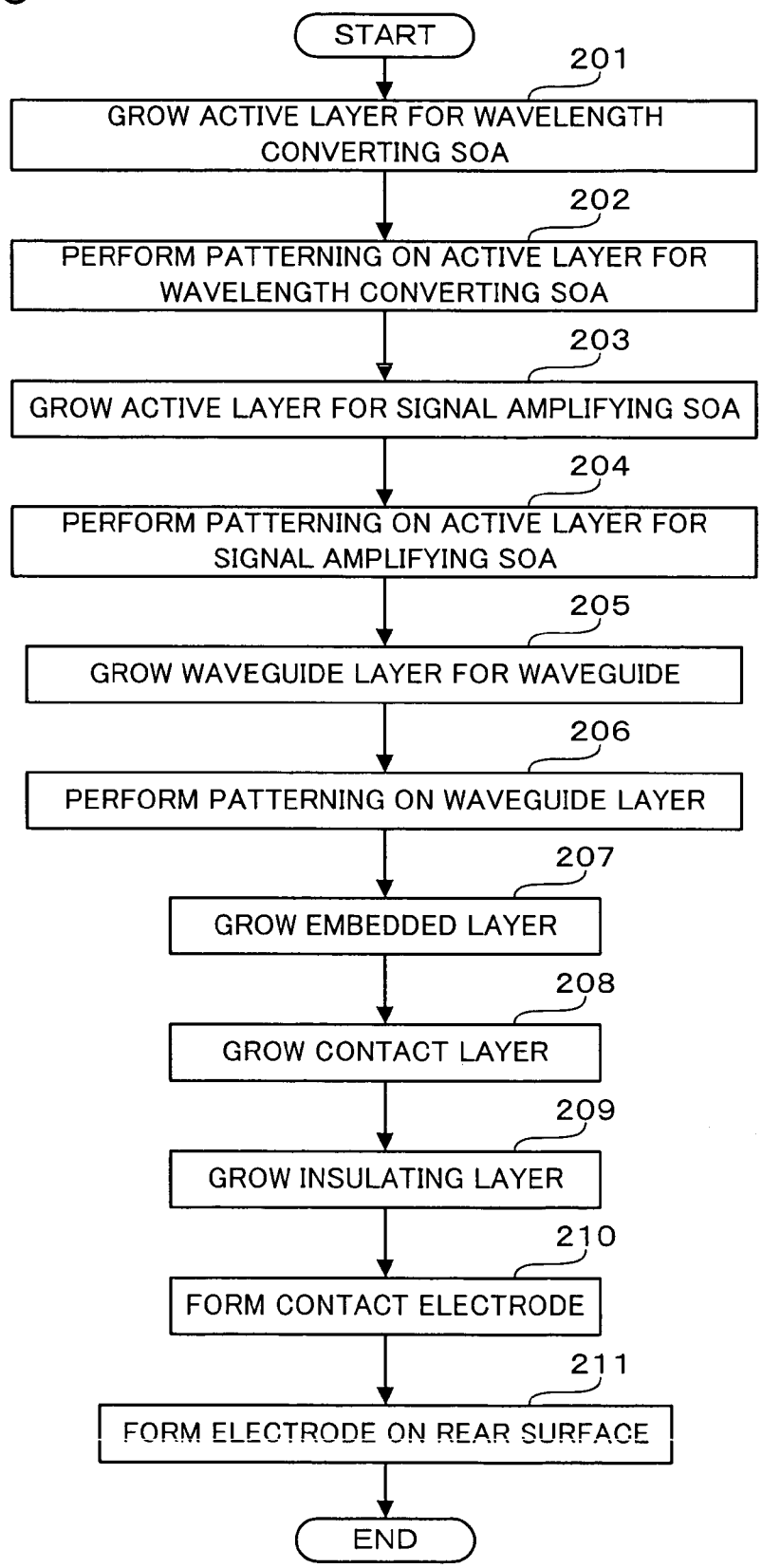
FIG. 8 is a flow chart of a procedure of manufacturing an optical wavelength converter according to Embodiment 2 of the present invention.

FIG. 7 shows data of differential gains relative to wavelengths of the wavelength converting SOA and the signal amplifying SOA according to Embodiment 2 of the present invention. FIG. 8 is a flow chart of a procedure of manufacturing an optical wavelength converter according to Embodiment 2.

An optical wavelength converter according to Embodiment 2 has the same components as those of the optical wavelength converter 1 according to Embodiment 1 except the signal amplifying SOA. Thus, the same components are denoted by the same reference numerals, and their descriptions are omitted.

The composition of the InGaAsP layer 12 serving as the active layer differs between the signal amplifying SOA and the wavelength converting SOA 3. Then, the differential gain of the signal amplifying SOA is smaller than the differential gain of the wavelength converting SOA 3 in a wavelength range of from 1530 nm to 1600 nm, as shown in FIG. 7.

For example, when the wavelength of λs and the wavelength of λo are assumed to be 1545 nm and 1550 nm, respectively, the differential gains thereof are 5.5 and 9, respectively. Thus, even if the input signal light has a large intensity, the differential gains are small. As a result, signal deformation can be prevented.

Next, description will be made of a procedure of manufacturing an optical wavelength converter according to Embodiment 2 with reference to FIG. 8.

Steps S201, S202, and S205 to S211 in a flow chart of FIG. 8 are the same as steps S101 to S109 in FIG. 5, respectively. Thus, descriptions thereof are omitted.

In steps S201 and S202, patterning is performed to form the active layer and clad layer of the wavelength converting SOA 3.

Subsequently, in step S203, the n-InP clad layer 11, the InGaAsP layer 12 as the active layer, and the first p-InP clad layer 13 are grown over the entire surface of the n-InP substrate 2 in the stated order by an organic metal vapor phase epitaxy method. At this point, a concentration of organic metal molecules in the formation of the InGaAsP layer is different from that in the growth of the InGaAsP layer of the wavelength converting SOA 3.

In step S204, the mask, which is made of the mesa film, is formed at the position where the signal amplifying SOA is arranged, and then, etching is performed. Therefore, the formation of the waveguide is performed similarly to Embodiment 1.

In the optical wavelength converter as described above, the differential gain of the SOA is changed by changing the composition of the InGaAsP layer serving as the active layer. Thus, the possible wavelength range of the input signal light is wider than that of the direct current light. Therefore, the optical wavelength converter can be applied to conversion with a wide range of wavelengths.

Embodiment 3

Figure 9:
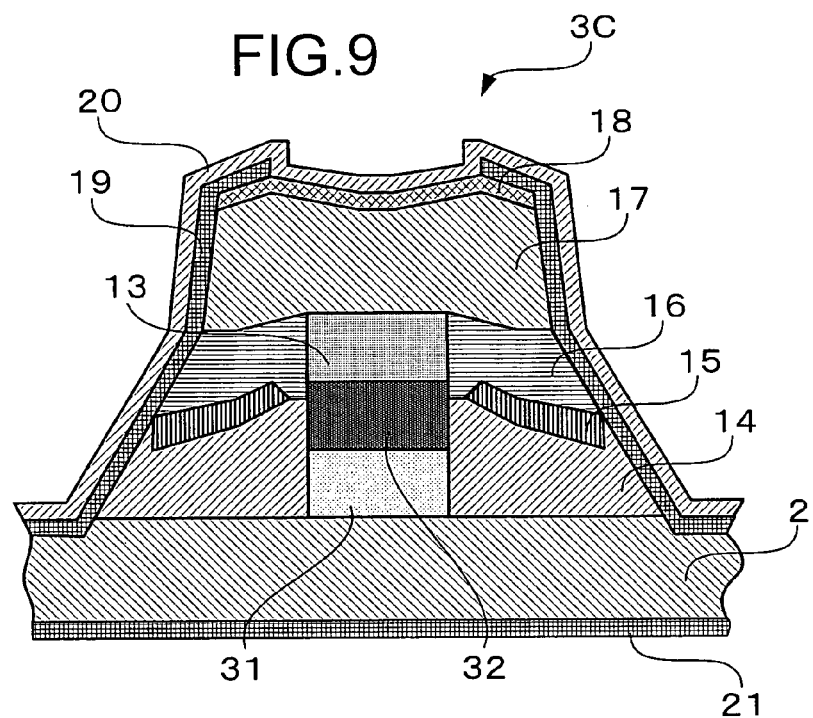
FIG. 9 is a sectional view of a wavelength converting SOA according to Embodiment 3 of the present invention.
Figure 10:
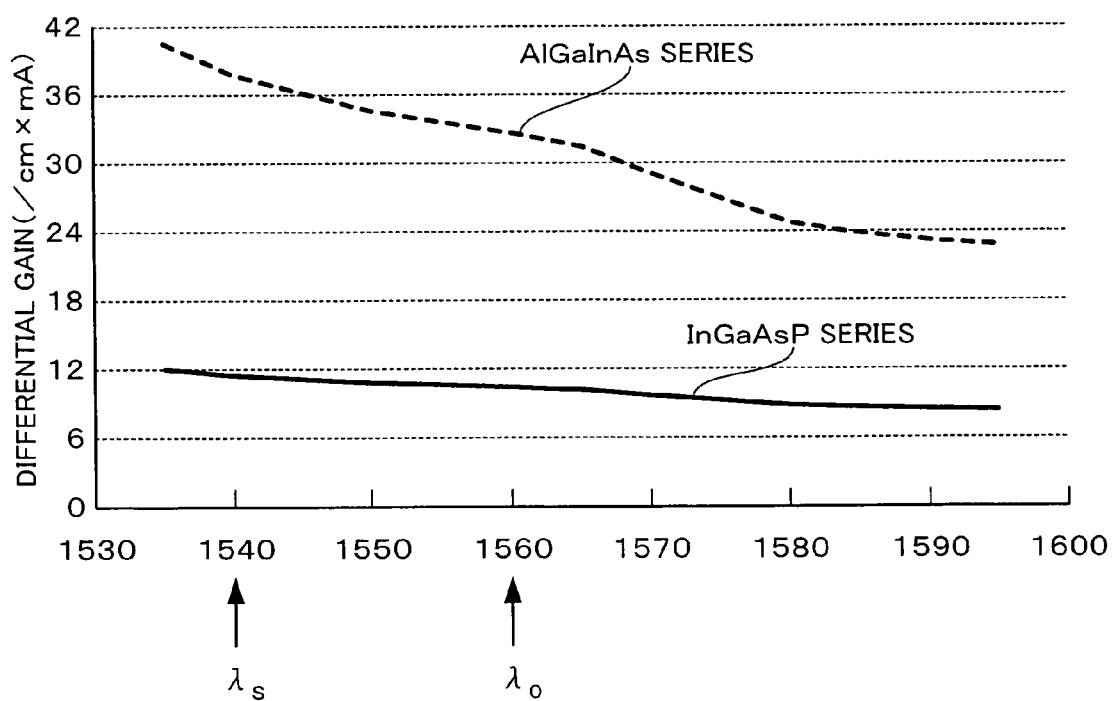
FIG. 10 shows data of differential gains with respect to a wavelength of the wavelength converting SOA and a wavelength of a signal amplifying SOA according to Embodiment 3 of the present invention.
Figure 11:
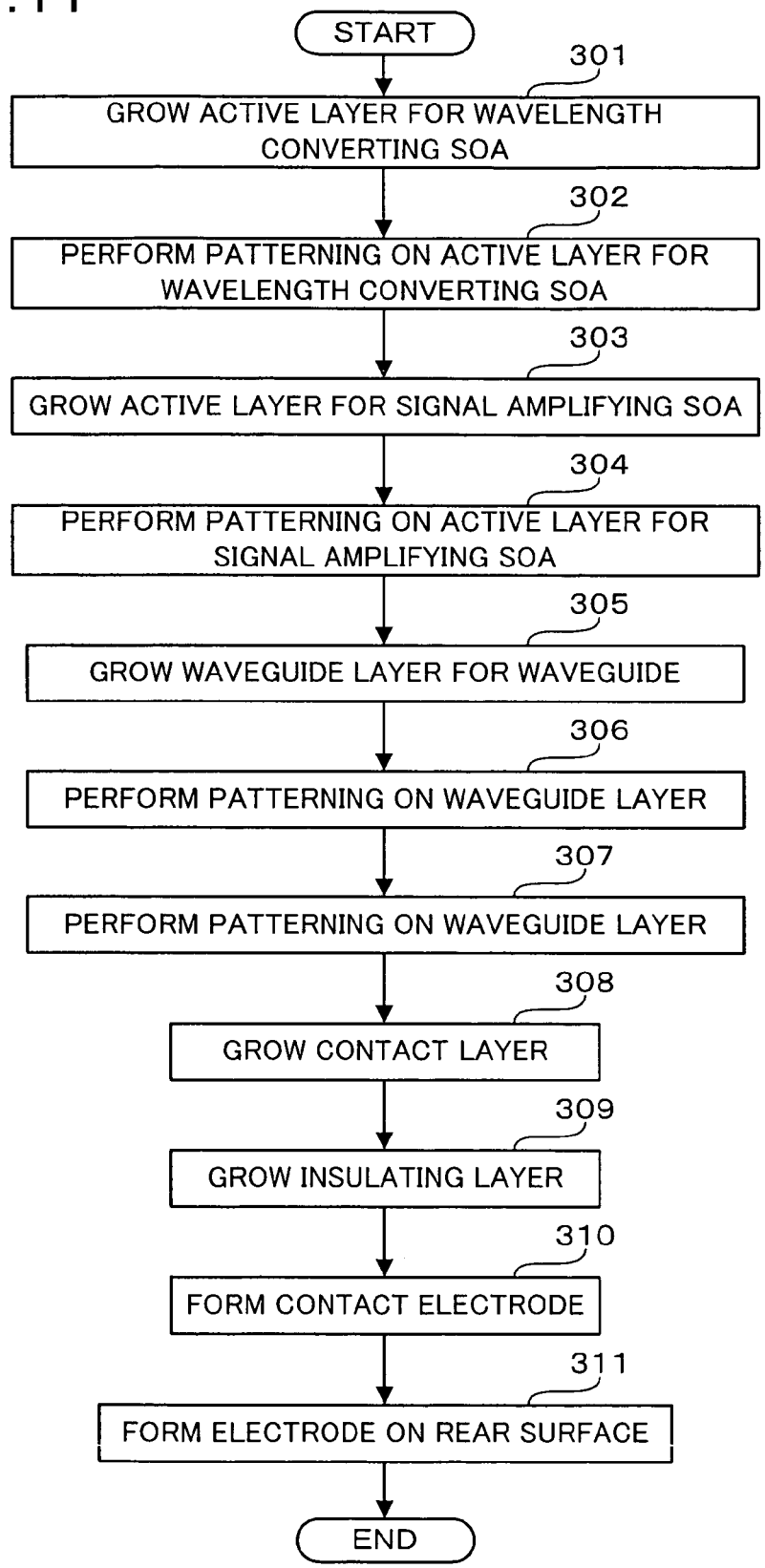
FIG. 11 is a flow chart of a procedure of manufacturing an optical wavelength converter according to Embodiment 3 of the present invention.

FIG. 9 is a sectional view of a wavelength converting SOA according to Embodiment 3 of the present invention. FIG. 10 shows data of differential gains relative to wavelengths of the wavelength converting SOA and the signal amplifying SOA according to Embodiment 3. FIG. 11 is a flow chart of a procedure of manufacturing an optical wavelength converter according to Embodiment 3.

An optical wavelength converter according to Embodiment 3 has the same components as those of the optical wavelength converter 1 according to Embodiment 1 except the signal amplifying SOA 3C. Thus, the same components are denoted by the same reference numerals, and their descriptions are omitted.

In the wavelength converting SOA 3C, as shown in FIG. 9, sequentially laminated on the n-InP substrate 2 are an AlInAs clad layer 31, an AlGaInAs layer 32 serving as an active layer, and the first p-InP clad layer 13, each of which has a width of 1 μm and a length of 2 mm.

Embedded on both sides of the layers 11, 12, and 13 in their width directions are the first p-InP layer 14, the n-InP layer 15, and the second p-InP layer 16.

Further, the second p-InP clad layer 17 is laminated so as to cover the first p-InP clad layer 13 and the second p-InP layer 16. Then, the contact layer 18 is laminated so as to cover the second p-InP clad layer 17.

Moreover, the insulating film 19 is laminated to cover the contact layer 18 except a part thereof and cover side surfaces of the first p-InP layer 14, the n-InP layer 15, and the second p-InP layer 16, which have been embedded, and side surfaces of the second p-InP clad layer 17.

Furthermore, the contact electrode 20 is laminated to cover the insulating film 19 and the contact layer 18 exposed at an opening of the insulating film 19. On the other hand, the electrode 21 is formed on a rear surface of the n-InP substrate 2.

The AlGaInAs layer 32 serving as the active layer is clad by the AlInAs clad layer 31 and the p-InP clad layer 13. Thus, as shown in FIG. 10, the differential gain of the wavelength conversion 3C is several times larger than the differential gain of the signal amplifying SOA 8 in a wavelength range of from 1530 nm to 1600 nm.

For example, when the wavelength of λs and the wavelength of λo are assumed to be 1540 nm and 1560 nm, respectively, the differential gains thereof are 9 and 33. Thus, the differential gain is small in amplification of the input signal light. Therefore, even if the input signal light has a large intensity, signal deformation can be prevented. Also, saturation output of the output signal light can be increased.

Next, description will be made of the procedure of manufacturing the optical wavelength converter according to Embodiment 3 with reference to FIG. 11.

Steps S303 to S311 in the flow chart of FIG. 11 correspond to Steps S101 to S109 in the flow chart of FIG. 5, respectively, and have the same contents as Steps S101 to S109. Thus, descriptions thereof are omitted.

In step S301, the AlInAs clad layer 31, the AlGaInAs layer 32 as the active layer, and the first p-InP clad layer 13 are grown over the entire surface of the n-InP substrate 2 in the stated order by the organic metal vapor phase epitaxy method.

In step S302, the mask made of the mesa film is formed at the position where the wavelength converting SOA is arranged, and then, etching is performed. Thereafter, in step S303, the n-InP clad layer 11, the InGaAsP layer 12 serving as the active layer, and the first p-InP clad layer 13 are grown over the entire surface of the n-InP substrate 2 in the stated order by the organic metal vapor phase epitaxy method similarly to Embodiment 1.

In step S304, the mask, which is made of the mesa film, is formed at the position where the signal amplifying SOA 8 is arranged, and then etching is performed. Subsequently, the waveguide formation is conducted.

The above-described optical wavelength converter adopts the AlGaInAs layer as the active layer of the wavelength converting SOA 3C and the InGaAsP layer as the active layer of the signal amplifying SOA 8, and is structured such that the differential gain of the signal amplifying SOA 8 is less than the differential gain of the wavelength converting SOA 3C. The AlGaInAs layer has a differential gain several times larger than that of the InGaAsP layer. Therefore, the limitation on the selection of the wavelength of the input signal light and the direct current light is relaxed.

Embodiment 4

An optical wavelength converter according to Embodiment 4 of the present invention has the same components as those of the optical wavelength converter 1 according to Embodiment 4 except the signal amplifying SOA. Thus, the same components are denoted by the same reference numerals, their descriptions are omitted.

According to Embodiments 1 to 3, the wavelength converting SOAs have the same optical confinement coefficient, length, and sectional area of the active layer as those of the signal amplifying SOAs, and only their differential gains are different between the SOAs. In contrast, the optical wavelength converter according to Embodiment 4 of the present invention is structured to have different length and differential gains between the SOAs.

The wavelength converting SOA 3 and the signal amplifying SOA 8 in Embodiment 1 have the same structures each including an active-layer length of 2 mm. On the other hand, the signal amplifying SOA in Embodiment 4 has an active-layer length of 1.5 mm, which is shorter by 0.5 mm, while the wavelength converting SOA in Embodiment 4 still has an active-layer length of 2 μm.

The length of the active layer of the signal amplifying SOA is shortened as described above, whereby the light induced by the input signal light is reduced. Therefore, the possible wavelength range of the input signal light can be widened compared with the case where only the differential gain is reduced.

Embodiment 5

An optical wavelength converter according to Embodiment 5 of the present invention has the same components as those of the optical wavelength converter 1 according to Embodiment 1 except the signal amplifying SOA. Thus, the same components are denoted by the same reference numerals, and their descriptions are omitted.

According to Embodiments 1 to 3, the wavelength converting SOAs have the same optical confinement coefficient, length, and sectional area of the active layer as those of the signal amplifying SOAs, and only their differential gains are different between the SOAs. In contrast, the optical wavelength converter according to Embodiment 5 of the present invention is structured to have different width of the active layer and differential gains between the SOAs.

The wavelength converting SOA 3 and the signal amplifying SOA 8 in Embodiment 1 have the same structures each including an active-layer width of 1 μm. On the other hand, the signal amplifying SOA in Embodiment 5 has an active-layer width of 1.1 μm, which is wider by 0.1 μm, while the wavelength converting SOA in Embodiment 5 still has an active-layer length of 1.0 μm. As a result, the active layer of the signal amplifying SOA is larger in sectional area than the active layer of the wavelength converting SOA. Thus, saturation is difficult to be caused. Note that the increase in width of the active layer leads to a larger optical confinement coefficient, but the quotient obtained by dividing the optical confinement coefficient by the sectional area becomes smaller. Therefore, saturation is difficult to be caused.

The light confined in the active layer is reduced by increasing the width of the active layer of the signal amplifying SOA as described above. Therefore, the possible wavelength range of the input signal light can be expanded compared with the case where only the differential gain is reduced.

What is claimed is:

1. An optical wavelength converter, comprising:
   a first branch passage;
   a second branch passage, wherein
     the first branch passage and the second branch passage form part of a Mach-Zehnder interferometer,
     both of the first branch passage and the second branch passage receive direct current light at a fixed wavelength, and
     one of the first branch passage and the second branch passage receives input signal light having a signal wavelength;
   first and second wavelength converting semiconductor optical amplifiers inserted into the first branch passage and the second branch passage, respectively; and
   a signal amplifying semiconductor optical amplifier for amplifying the input signal light, and coupled with a port through which the input signal light is input to the one of the first branch passage and the second branch passage, wherein
     each of the first and second wavelength converting semiconductor optical amplifiers and the signal amplifying semiconductor optical amplifier includes a respective active layer, and
     the active layers of the first and second wavelength converting semiconductor optical amplifiers are different from the active layer of the signal amplifying semiconductor optical amplifier so that differential gain of the signal amplifying semiconductor optical amplifier at the signal wavelength of the input signal light is less than differential gain of the first and second wavelength converting semiconductor optical amplifiers at the fixed wavelength of the direct current light.

2. The optical wavelength converter according to claim 1, wherein the active layer of the signal amplifying semiconductor optical amplifier is shorter than the active layer of the first and second wavelength converting semiconductor optical amplifiers.

3. The optical wavelength converter according to claim 1, wherein the active layers of the signal amplifying semiconductor optical amplifier and the first and second wavelength converting semiconductor optical amplifiers have respective cross-sectional areas and ratio of optical confinement coefficient to cross-sectional area of the active layer of the signal amplifying semiconductor optical amplifier is smaller than ratio of optical confinement coefficient to the cross-sectional area of the active layer of the first and second wavelength converting semiconductor optical amplifiers.

4. The optical wavelength converter according to claim 1, wherein the active layers of the signal amplifying semiconductor optical amplifier and the first and second wavelengths converting semiconductor optical amplifiers are compound semiconductor materials having the same constituents but in different proportions so that the compound semiconductor material of the active layer of the signal amplifying semiconductor optical amplifier has different characteristics from the compound semiconductor material of the active layers of the first and second wavelength converting semiconductor optical amplifiers.

5. The optical wavelength converter according to claim 1, wherein the active layer of the signal amplifying semiconductor optical amplifier is a first compound semiconductor material and the active layers of the first and second wavelengths converting semiconductor amplifiers are a second compound second semiconductor material, different from the first compound semiconductor material.

6. The optical wavelength converter according to claim 5, wherein the first compound semiconductor material is InGaAsP and the second compound semiconductor material is AlGaInAs.

7. The optical wavelength converter according to claim 1, wherein the active layer of the signal amplifying semiconductor optical amplifier has a first width and the active layers of the first and second wavelength confining semiconductor optical amplifiers have a second width, narrower than the first width.

* * * * *